United States Patent [19]

Levy et al.

[11] Patent Number: 4,847,463
[45] Date of Patent: Jul. 11, 1989

[54] METHOD FOR THE ELECTROEROSIVE MACHINING OF ELECTRICALLY SLIGHTLY OR NON-CONDUCTIVE WORKPIECES, AS WELL AS ELECTROEROSION MACHINE FOR PERFORMING THE METHOD

[75] Inventors: Gideon Levy, Orselina, Switzerland; Daryl Di Bitonto, Bryan, Tex.

[73] Assignee: AG fur industrielle Elektronik AGIE, Losone bei Locarno, Switzerland

[21] Appl. No.: 154,668

[22] Filed: Feb. 10, 1988

[30] Foreign Application Priority Data

Feb. 25, 1987 [DE] Fed. Rep. of Germany ....... 3706124

[51] Int. Cl.$^4$ ........................... B23H 5/00; B23H 7/02
[52] U.S. Cl. ............................... 219/69.12; 204/129.3; 219/121.19; 219/121.68; 219/69.17; 250/492.1; 378/210
[58] Field of Search ........... 219/69 M, 69 W, 121.68, 219/121.69, 121.19, 121.20, 68, 69 R; 250/341, 492.1, 492.3; 378/1, 44, 51, 70, 210; 264/22, 25, 27; 204/206, 129.3, 224 M

[56] References Cited

U.S. PATENT DOCUMENTS

| | | | |
|---|---|---|---|
| 2,939,941 | 6/1960 | Heerschap et al. | 219/69 M |
| 4,045,674 | 8/1977 | Vermuelen | 250/492.1 |
| 4,448,656 | 5/1984 | Kuromatsu | 219/69 M |
| 4,559,115 | 12/1985 | Inoue | 219/69 M |
| 4,608,138 | 8/1986 | Kobayashi | 219/69 M |

Primary Examiner—A. D. Pellinen
Assistant Examiner—Geoffrey S. Evans
Attorney, Agent, or Firm—Helfgott & Karas

[57] ABSTRACT

In the electroerosive working or machining of electrically slight or non-conducting workpieces, the workpieces are made electrically conductive, at least in parts of an electroerosion working zone, by means of the supply to the workpieces of electromagnetic energy. As a result, the valency band of the atoms of the workpiece is raised, which produces therein the electrical conductivity.

12 Claims, 1 Drawing Sheet

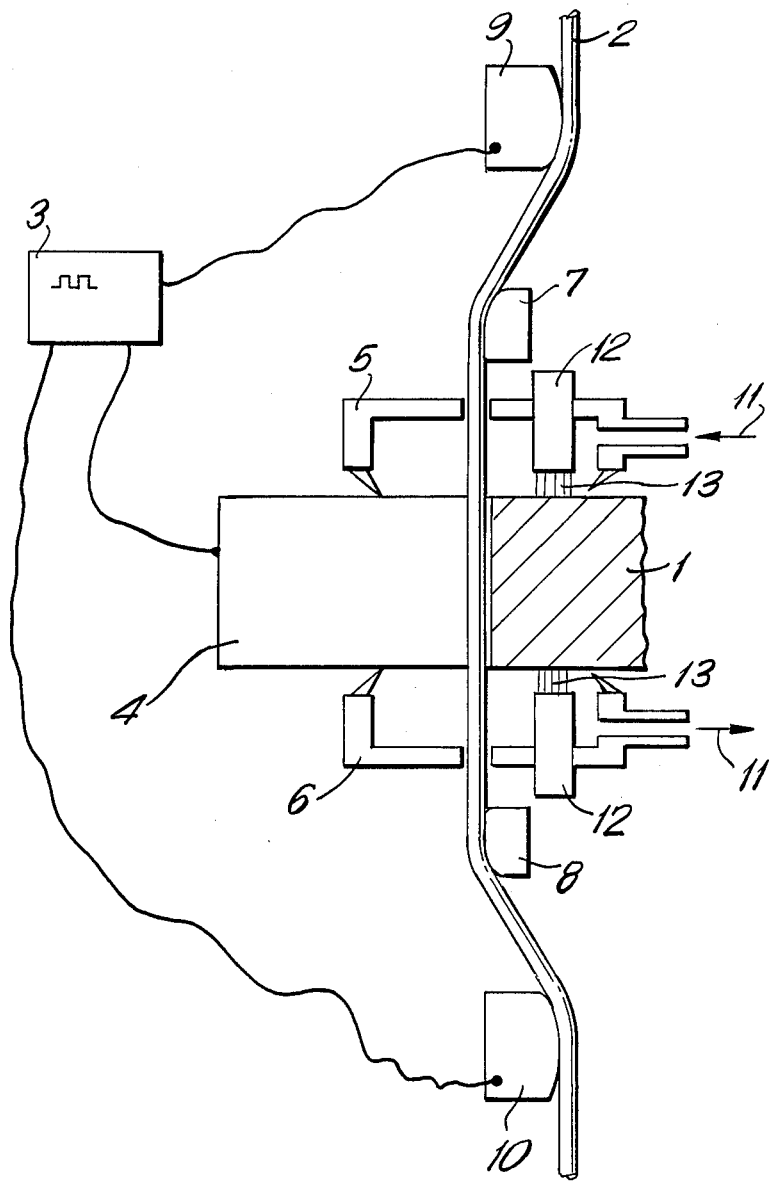

METHOD FOR THE ELECTROEROSIVE MACHINING OF ELECTRICALLY SLIGHTLY OR NON-CONDUCTIVE WORKPIECES, AS WELL AS ELECTROEROSION MACHINE FOR PERFORMING THE METHOD

BACKGROUND OF THE INVENTION

The invention relates to a method for the electroerosive working or machining of electrically slightly or non-conductive workpieces as well as to an electroerosion machine for performing the method.

It is known that the electrical conductivity of workpieces is an essential prerequisite for the electroerosive machining thereof. Admittedly a relatively limited conductivity is sufficient, so that e.g. polycrystalline diamonds containing binders can be electroerosively worked (cf. European Patent No. 0 006 827).

JP-OS No. 59-224 216 (Inoue-Japax) proposes the application of an electrically conductive material to a poorly conducting workpiece and to so arrange the tips of two electrodes with respect to the surface to be worked, that discharges occur between them and the electrically conductive material, so that part of the workpiece is removed by melting. This is a process which takes place without a dielectric.

It is known from Swiss patent No. 617 378 to provide an insulating material, e.g. a quartz plate, which is to be electroerosively cut with an electrically conductive layer, so that it can be cut by electroerosion. However, the application of this layer is an additional, tedious working step. Moreover, for most applications, this layer must be removed again after cutting. The method described therein only functions in the case of very thin layers.

For the discharge grinding of conductive workpieces, it is known from DE-Os No. 32 23 269 to provide the grinding wheel with alternately arranged conductive areas and non-conductive grinding areas. If the grinding wheel is rapidly rotated and an s.c. or d.c. voltage is applied thereto, a conductive state is brought about in an otherwise non-conductive workpiece through electrical induction, so that there can also be electric discharges between the grinding wheel and the workpiece. However, the electric discharges are only intended to partly melt the workpiece, the actual removal taking place by mechanical working (machining).

As this grinding takes place without a dielectric, there are serious doubts whether in fact electroerosive processes take place. It is therefore to be assumed that this apparatus will work equally well without a voltage.

The present invention aims at providing the possibility of being able to electroerosively work electrically poorly conducting or non-conducting workpieces, without it being necessary to specially prepare the workpiece beforehand.

Therefore the basic principle of the invention is to make electrically poorly or non-conducting workpieces electrically conductive through the supply of energy. This can be physically explained by the fact that through the supply of this energy, the crystal lattices or atoms are oscillated or vibrated in such a way that the free electrons essential for electrical conductivity are formed. Thus, through the energy supply the valency band of electrons is raised. The energy supply is to be adjusted in such a way that the crystal lattices are not destroyed and that only electrons are released.

Although all known energy sources bringing about this effect can be used, preference is given to radiation energy sources and among these laser energy sources. Other radiation sources which can be used are infra-red, X, $\beta$ or $\gamma$-radiation.

The radiation energy can act on the workpiece in such a way that the latter becomes completely conductive. However, it is also adequate to excite or render conductive the workpiece only in the electroerosion working zone, or even only in portions thereof.

The invention makes it possible to electroerosively work even electrically non-conductive workpieces, such as quartz, glass, natural diamonds, etc. Electroerosive working or machining can be counter-sinking or cutting with the standard known variants thereof, such as drilling and the like. There is no need to prepare the workpieces prior to electroerosive machining in a special way, such as is necessary e.g. in Swiss Patent No. 617 378.

Another advantage is that existing erosion machines can be easily reequipped by incorporating an additional energy source, so that they are then suitable both for the machining of electrically conductive and also electrically non-conductive workpieces. In the case of conventional feed rates for the electroerosion, the action time of the energy source is adequate for bringing about the desired conductivity, so that there is no slowing down of the machining process.

From the time standpoint, the energy source preferably acts on the workpiece immediately before the electrode, i.e. is in advance thereof in the feed direction. Therefore only those areas of the workpiece which are momentarily required are made electrically conductive, so that the energy used can be kept relatively small. It is adequate if the energy source supplies its energy to the workpiece surface. When using a radiation source, there is consequently no need for the radiation to directly strike all areas of the working gap.

BRIEF DESCRIPTION OF THE DRAWING

The invention is described in greater detail hereinafter relative to an embodiment and the attached drawing. The single FIGURE of the drawing is a diagramatic sectional view of the essential parts of an electroerosion machine according to the invention, in the case of a wire cutting machine.

The workpiece 1 is cut by a wire-like electrode 2, workpiece 1 and wire electrode 2 being electrically connected to a generator 3, which generates electric pulses. In the drawing wire electrode 2 has already made a cut 4. On either side of the cutting area are provided purging or wire guide heads 5,6, whilst the wire guides 7,8 and power supplies 9,10 are only diagrammatically indicated. Through an opening 11 a purging fluid flows into the upper head 5, from there through the working gap into the lower head 6 and it is there sucked out through the opening 11. In the represented embodiment energy sources 12 are provided in both heads 5,6, so that energy is applied to the top and bottom surfaces of workpiece 1. The radiation is indicated by reference numeral 13.

Due to the enrgy supplied by energy source 12 to workpiece 1, the valency band of the electrons of the workpiece is raised, so that the workpiece is electrically conductive in this area and can be electroerosively cut in known manner by the wire electrode 2. Although not expressly shown in the drawing, the electrode of generator 3 connected to workpiece 1 can be so connected to the latter, e.g. by means of sliding contracts, that it is very near to the workpiece area subject to the action of the energy sources 12.

We claim:

1. Electroerosion machine for machining electrically slightly or non-conducting workpieces, comprising an electrode, a first energy source which generates an energy required for a spark discharge, a second energy source arranged in such a way that its energy strikes the workpiece and the energy striking the workpiece from the second energy source having such an intensity that the workpiece is made electrically conductive at least in parts of an electroerosion working zone, said second energy source being fitted to a purging and guide head for the electrode so that it has a constant spacing from the electrode.

2. Electroerosion machine according to claim 1, wherein the second energy source is so positioned with respect to the electrode, that its energy, with respect to the working direction strikes the workpiece before the electrode.

3. Electroerosion machine according to claim 1, wherein the second energy source is constructed and arranged in such a way that its energy strikes the workpiece coaxially around the electrode.

4. Electroerosion machine according to claim 2, wherein the second energy source is selected from the group consisting of a laser, an infra-red X, $\beta$ or $\gamma$-radiation source.

5. Electroerosion machine according to claim 2, wherein the second energy source is selected from the group consisting of a laser, an infra-red, X, $\beta$ or $\gamma$-radiation source.

6. Electroerosion machine according to claim 2, wherein the second energy source is fitted to each of two purging and guide heads positioned above and below the workpiece, respectively.

7. Electroerosion machine according to claim 1, wherein the second energy source is fitted to each of two purging and guide heads positioned above and below the workpiece, respectively.

8. Electroerosion machine from machining electrically slightly or non-conducting workpieces, comprising an electrode, a first energy source, which generates an energy required for a spark discharge, a second energy source arranged in such a way that its energy strikes the workpiece, and the energy striking the workpiece from the second energy source having such an intensity that the workpiece is made electrically conductive at least in parts of an electroerosion working zone, said second energy source being constructed and arranged in such a way that its energy strikes the workpiece coaxially around the electrode.

9. Electroerosion machine according to claim 8, wherein the second energy source is selected from the group consisting of a laser, an infra-red, X, $\beta$ or $\gamma$-radiation source.

10. Electroerosion machine according to claim 8, wherein the second energy source is fitted to each of two purging and guide heads positioned above and below the workpiece, respectively.

11. Method of electroerosive machining of electrically slightly or non-conducting workpieces, comprising the steps of providing an electrode, a first energy source for generating an energy required for a spark discharge and a second energy source, arranged in a constant spaced relationship with the electrode so that the energy produced by the second energy electrode and striking a workpiece has an inensity to make the workpiece electrically conductive at least in parts of an electroerosion working zone.

12. Method according to claim 11, wherein said second energy source is selected from the group consisting of a laser, an infra-red, X, $\beta$, or $\gamma$-radiation source.

* * * * *